(12) United States Patent
Stilleke et al.

(10) Patent No.: US 8,540,317 B2
(45) Date of Patent: Sep. 24, 2013

(54) FITTING FOR A VEHICLE SEAT

(75) Inventors: Martin Stilleke, Recklinghausen (DE); Uwe Assmann, Remscheid (DE); Arkadius Rock, Solingen (DE)

(73) Assignee: Keiper GmbH & Co. KG, Kaiserslautern (DE)

( * ) Notice: Subject to any disclaimer, the term of this patent is extended or adjusted under 35 U.S.C. 154(b) by 89 days.

(21) Appl. No.: 13/256,499

(22) PCT Filed: Aug. 2, 2010

(86) PCT No.: PCT/EP2010/004717
§ 371 (c)(1),
(2), (4) Date: Sep. 14, 2011

(87) PCT Pub. No.: WO2011/023278
PCT Pub. Date: Mar. 3, 2011

(65) Prior Publication Data
US 2012/0007402 A1    Jan. 12, 2012

(30) Foreign Application Priority Data
Aug. 26, 2009  (DE) .................. 10 2009 039 461

(51) Int. Cl.
*B60N 2/02* (2006.01)
(52) U.S. Cl.
USPC ..................... 297/362.11; 475/177
(58) Field of Classification Search
USPC ............... 297/362, 362.11, 362.12; 475/162, 475/175, 177
See application file for complete search history.

(56) References Cited

U.S. PATENT DOCUMENTS

| 4,598,947 | A  | * | 7/1986  | Fourrey et al.    | 297/362 |
| 5,634,689 | A  |   | 6/1997  | Putsch et al.     |         |
| 5,871,414 | A  | * | 2/1999  | Voss et al.       | 475/175 |
| 6,799,806 | B2 |   | 10/2004 | Eppert et al.     |         |
| 7,188,903 | B2 | * | 3/2007  | Finner et al.     | 297/362 |
| 7,243,994 | B2 | * | 7/2007  | Cha               | 297/362 |
| 7,278,689 | B2 | * | 10/2007 | Guillouet         | 297/362 |
| 7,455,361 | B2 | * | 11/2008 | Stemmer et al.    | 297/362 |

(Continued)

FOREIGN PATENT DOCUMENTS

DE  4436101 A1   6/1995
DE  19548809 C1  5/1997

(Continued)

*Primary Examiner* — Sarah B McPartlin
(74) *Attorney, Agent, or Firm* — McGlew and Tuttle, P.C.

(57) ABSTRACT

A fitting (10) for a vehicle seat, in particular for a motor vehicle seat, includes a first fitting part (11), on which a ring gear (17) is formed, a second fitting part (12), on which a gear (16) is formed, which gear meshes with the ring gear (17), whereby the two fitting parts (11, 12) are in a transmission connection with each other, and a rotating eccentric (27, 35) for driving a relative rolling motion of the gear (16) and the ring gear (17). The eccentric is driven by a carrier (21), wherein the eccentric (27, 35) is rotatably supported in a collar (38), which is associated with one of the two fitting parts (11, 12), or in a bushing (28) sitting in said collar (38) in a rotationally fixed manner. A blocking element (50) for the eccentric (27, 35) is operative at least at times between the eccentric (27, 35) and the bushing (28). The bushing (28) has teeth (28a) pointing radially outward and the blocking element (50), which surrounds the bushing (28) annularly, has at least one, in particular two, tooth segments (58) pointing radially inward for interacting with the teeth (28a).

20 Claims, 4 Drawing Sheets

(56) References Cited

U.S. PATENT DOCUMENTS 7,607,737 B2 * 10/2009 Liebich et al. ................ 297/362
7,731,289 B2 * 6/2010 Matsumoto et al. .......... 297/362
8,282,167 B2 * 10/2012 Kirubaharan et al. ........ 297/362
8,286,777 B2 * 10/2012 Kirubaharan .............. 192/223.1

FOREIGN PATENT DOCUMENTS

| DE | 10232029 A1 | 2/2004 |
| DE | 10 2007 010 078 A1 | 9/2008 |
| DE | 10 2007 010 078 B4 | 11/2008 |
| DE | 20 2008 001 597 U1 | 6/2009 |

* cited by examiner

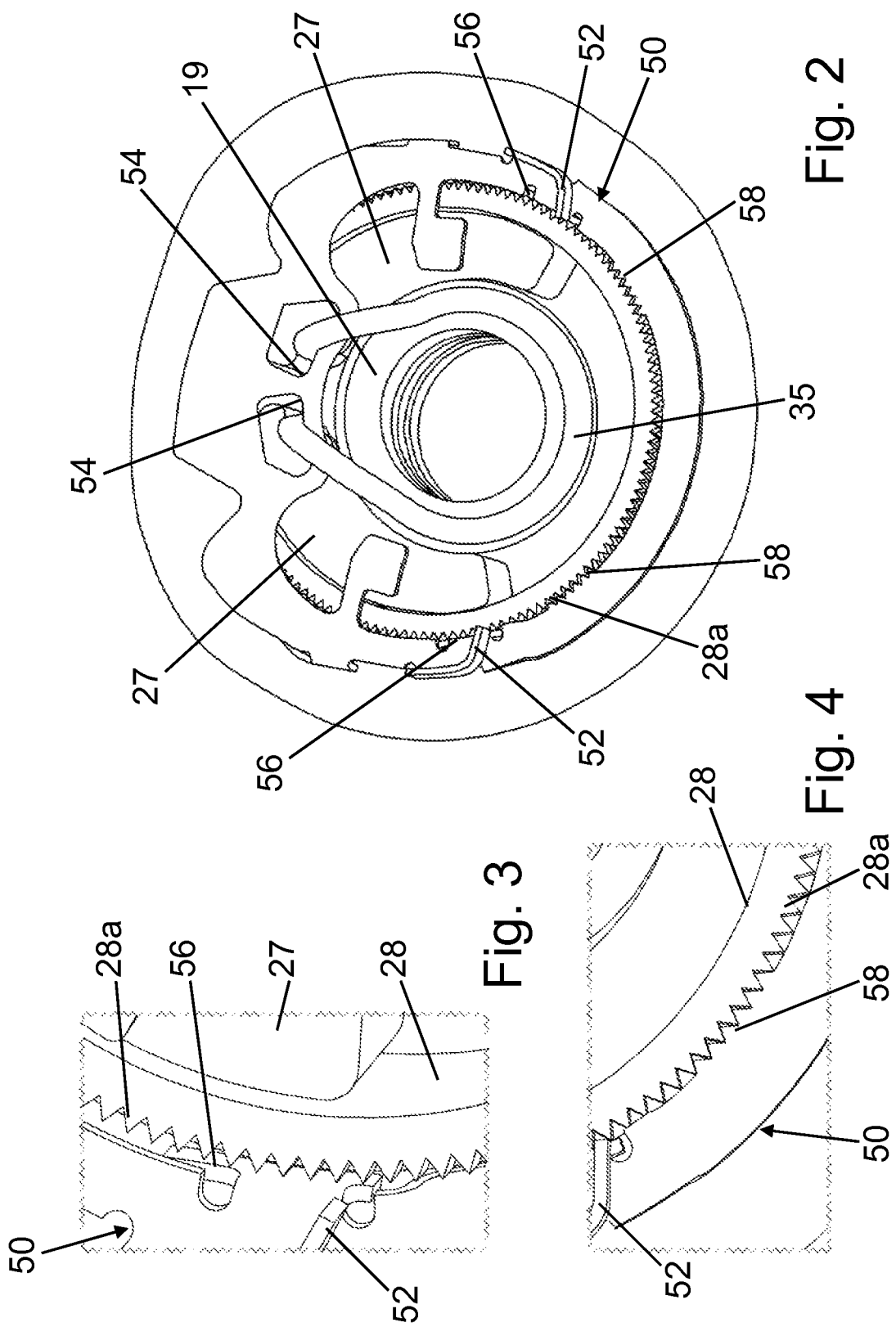

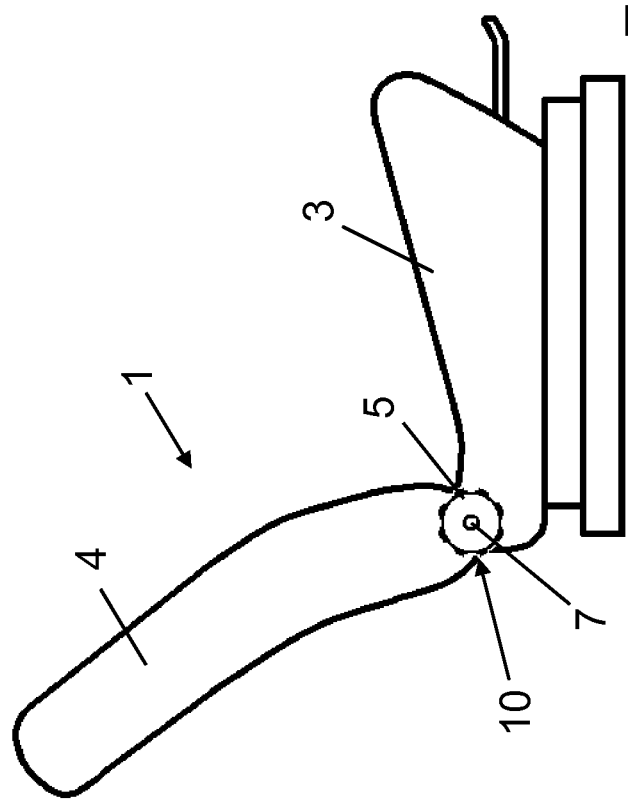

FITTING FOR A VEHICLE SEAT

CROSS REFERENCE TO RELATED APPLICATIONS

This application is a U.S. National Phase application of International Application PCT/EP2010/004717 and claims the benefit of priority under 35 U.S.C. §119 of German Patent Application DE 10 2009 039 461.3 filed Aug. 26, 2009, the entire contents of which are incorporated herein by reference.

FIELD OF THE INVENTION

The invention relates to a fitting for a vehicle seat, in particular for a motor vehicle seat, having a first fitting part on which a toothed ring is formed, a second fitting part on which a toothed wheel is formed which meshes with the toothed ring, as a result of which the two fitting parts are in gear connection with each other, a circumferential eccentric, driven by a driver, for driving a relative rolling movement of the toothed wheel and the toothed ring, the eccentric being rotatably mounted in a collar which is assigned to one of the two fitting parts, or in a bearing bush which is supported in a rotationally secure manner in this collar, and a locking element for the eccentric that is at least temporarily effective between the eccentric and the fitting part which is provided with the collar.

BACKGROUND OF THE INVENTION

A fitting of this type is known, for example, from DE 10 2007 010 078 B4. The locking element which is described there, denominated braking element, in its unlocked state, is arranged within the radius of the bearing bush. If the fitting is exposed to a torque on the drive output side, for example by shaking or pushing at the backrest, a wedge segment is allowed to move slightly. The adjacent Omega spring acts upon the locking element which tilts, thus going over into a locked state, in which it cooperates with a toothing which protrudes axially from the bearing bush, in order to avoid a further movement of the wedge segment. A so-called "spooling", i.e. a rotation of the fitting in tiny steps is avoided.

SUMMARY OF THE INVENTION

An object of the invention is to improve a fitting of the type mentioned in the introduction. According to the invention, a fitting for a vehicle seat is provided comprising a first fitting part on which a toothed ring is formed, a second fitting part on which a toothed wheel is formed which meshes with the toothed ring, as a result of which the two fitting parts are in gear connection with each other, a circumferential eccentric. A driver is provided for driving a relative rolling movement of the toothed wheel and the toothed ring. The eccentric is rotatably mounted in a collar which is assigned to one of the two fitting parts, or in a bearing bush which is supported in a rotationally secure manner in this collar. A locking element for the eccentric is at least temporarily effective between the eccentric and the fitting part which is provided with the collar. The bearing bush or the collar has a radially outward facing toothing. The locking element which surrounds the bearing bush and/or the collar in a ring-shaped manner has at least one, particularly two, radially inward facing toothed segments for cooperating with the toothing of the bearing bush or the collar.

Radially outside the collar with the bearing bush, there is space so that the bearing bush, for the necessary bearing support of the eccentric, has a certain width which is larger than the material strength of the assigned fitting part. Due to the fact that the bearing bush or the collar are provided with a radially outward pointing toothing and that the locking element which surrounds the bearing bush and/or the collar in the form of a ring has at least one, in particular two radially inward pointing toothed segments for cooperating with the toothing of the bearing bush, said space radially outside the bearing bush can be better made use of. The cooperation of the locking element with the bearing bush, compared to the cooperation with the back side of the toothed wheel, has the advantage that toothed wheel and toothed ring can be configured independently of the bearing of the eccentric. Having a locked state when the fitting is not activated, i.e. when the driver is not driven (non-driven) offers more security than if external influences first have to create the locked state.

The use of an eccentric epicyclic gear system in a fitting enables the inclination of the backrest of a vehicle seat to be adjusted continuously. The saving of a central pinion compared with a planetary gear system leads to the occurrence of a wobbling movement which is superimposed on the relative rotation of the fitting parts. The eccentric, which comprises, for example, two wedge segments braced apart by means of a spring, is preferably supported, on its side opposite the aforementioned bearing of the one fitting part, for example on the inside, on a collar of the other fitting part.

The invention is explained in more detail hereinafter with reference to an exemplary embodiment shown in the drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 2 is a perspective partial view of the exemplary embodiment without the driver;

FIG. 3 is a detailed view of a portion shown in FIG. 2;

FIG. 4 is a further detailed view of a portion shown in FIG. 2;

FIG. 5 is a schematic view of a vehicle seat according to the invention; and

DESCRIPTION OF THE PREFERRED EMBODIMENTS

Figure 1:
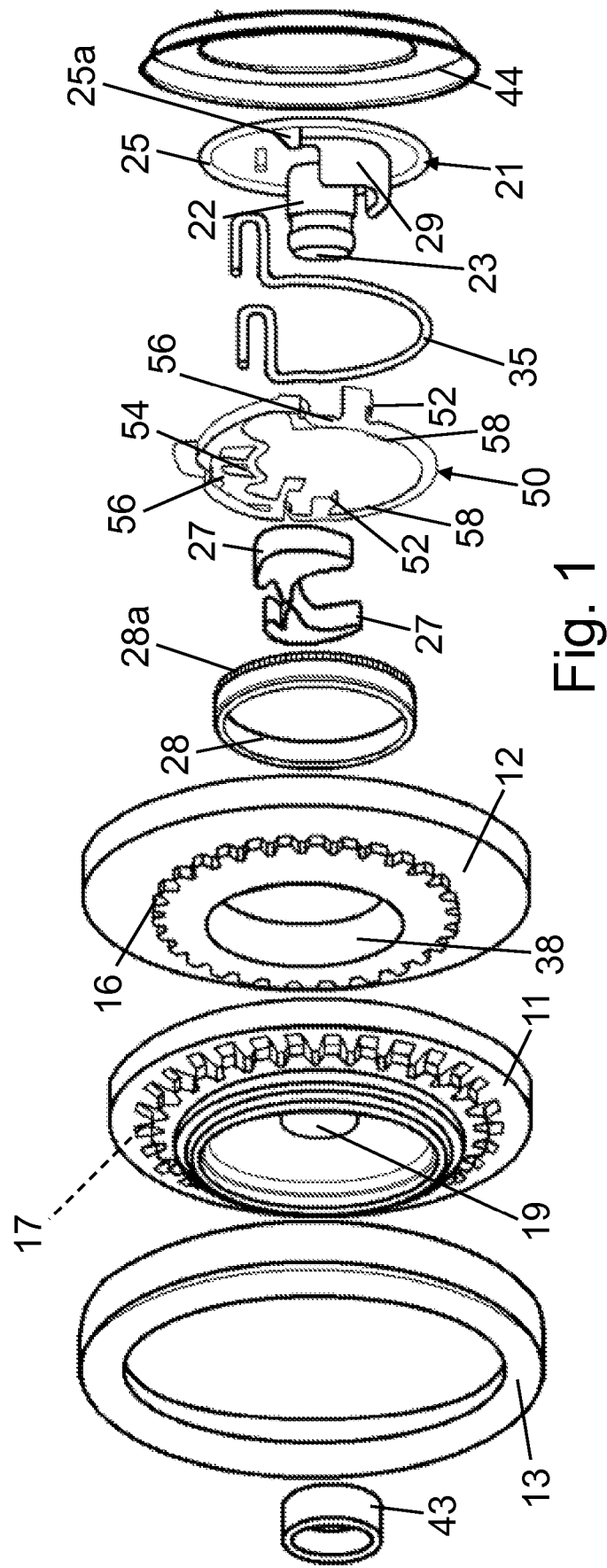
FIG. 1 is an exploded view of the exemplary embodiment according to the invention.

Referring to the drawings in particular, a vehicle seat 1 for a motor vehicle has a seat part 3 and a backrest 4, the inclination of which is adjustable relative to the seat part 3. In order to adjust the inclination of the backrest 4, a drive shaft 7, which is arranged horizontally in the transition region between the seat part 3 and the backrest 4, is rotated manually, for example, by means of a handwheel 5, or in a motor-driven manner, for example by means of an electrical motor. On both sides of the vehicle seat 1, the drive shaft 7 engages in a fitting 10 so that it is rotationally secure, in a manner which will be described later. The drive shaft 7 defines the adopted directional data of a cylinder coordinate system.

The fitting 10 is in the form of a gear fitting in which a first fitting part 11 and a second fitting part 12 are connected to each other by means of a gear unit for displacement and fixing in position, to be more precise, by means of an eccentric epicyclic gear system, which in the present case is self-locking, as described, for example, in DE 44 36 101 A1, the relevant disclosure of which is expressly incorporated herein (corresponding U.S. Pat. No. 5,634,689 is incorporated by reference in its entirety).

With the mounting of the fitting 10, the first fitting part 11 is, for example, connected tightly to the structure of the backrest 4, i.e. it is fixed with respect to the backrest part. The second fitting part 12 is then connected tightly to the structure of the seat part 3, i.e. it is fixed with respect to the seat part. Those assignments of the fitting parts 11 and 12 are preferred when the drive shaft 7 and the backrest 4 are to have the same direction of rotation, or when the position of the drive shaft 7 relative to the backrest 4 is to be constant in order, for example, to be able to fit to the structure of the backrest 4 an electrical motor rotating the drive shaft 7. However, the assignments of the fitting parts 11 and 12 can also be exchanged, i.e. the first fitting part 11 would then be fixed with respect to the seat part and the second fitting part 12 would be fixed with respect to the backrest. The latter assignments of the fitting parts 11 and 12 are preferred when the radial spacings of the fastening points between the fitting 10 and a relatively thin metal backrest sheet are to be as large as possible.

Each of the two fitting parts 11 and 12 can be approximately inscribed in a circular disk shape. The two fitting parts 11 and 12 are preferably composed of metal, in particular steel. In order to absorb the axially acting forces, i.e. in order to hold the fitting parts 11 and 12 together, an enclosing ring 13 is provided. Such a method of holding parts together by means of an enclosing ring is described, for example, in U.S. Pat. No. 6,799,806 A, the relevant disclosure of which is expressly incorporated herein by reference. The preferably metal enclosing ring 13 is, with the mounting of the fitting 10, connected tightly to the second fitting part 12, being preferably first of all pressed on and then welded. Alternatively, the enclosing ring 13 is beaded, engaging over the second fitting part 12. At one of its end faces, the enclosing ring 13 has an edge bent radially inwards by means of which it engages radially over the outside of the first fitting part 11, optionally with the interposition of a sliding ring, without impeding the relative movement of the two fitting parts 11 and 12. From a structural point of view, the two fitting parts 11 and 12 therefore together form a disk-shaped unit.

In order to form the gear unit, an externally toothed wheel 16 is formed on the second fitting part 12, and an internally toothed ring 17 is formed on the first fitting part 11, the toothed wheel and the toothed ring meshing with each other. The diameter of the tip circle of the external toothing of the toothed wheel 16 is smaller by at least the depth of one tooth (of the toothed ring 17) than the diameter of the root circle of the internal toothing of the toothed ring 17. A corresponding difference in the number of teeth of the toothed wheel 16 and the toothed ring 17 of at least one tooth permits a rolling movement of the toothed ring 17 on the toothed wheel 16.

On the side facing the toothed wheel 16, the first fitting part 11 has, concentrically with the toothed ring 17, a first collar 19 which can be integrally formed on (i.e. formed in one piece with) the first fitting part 11 as a collar formation or which can be secured thereto in the form of a separate sleeve. A driver 21 is supported rotatably in the first collar 19 by means of a hub 22. The driver 21 is preferably composed of plastics material. The hub 22 of the driver 21 is provided centrally with a bore 23 for receiving the drive shaft 7. The profile of the bore 23 is configured to fit the profile of the drive shaft 7, in the present case a splined shaft profile. Adjoining its hub 22, the driver 21 has a covering disk 25 which is formed in one piece with the hub 22 and which has a larger diameter than the hub.

Supported on the first collar 19 (with their curved inner surfaces) are two wedge segments 27 which support (with their curved outer surfaces) the second fitting part 12 by means of a slide bearing bush 28 which is seated in the second fitting part 12 in a rotationally secure manner. The driver 21 has—spaced radially from the hub 22—a driver segment 29 which engages with clearance between the narrow sides of the wedge segments 27 and which is formed in one piece with the covering disk 25 and the hub 22. The mutually facing broad sides of the wedge segments 27 each receive, with a respective recess defined by projecting sections of material, a respective angled end finger of an Omega spring 35 which presses the wedge segments 27 apart in the circumferential direction, it being possible during operation for the projecting material sections of the wedge segments 27 to touch and act on each other.

The slide bearing bush 28 is received by a receptacle in the second fitting part 12, the slide bearing bush 28 preferably being pressed into the second fitting part 12. The material of the second fitting part 12, which forms the edge of such receptacle and over which the slide bearing bush 28 axially protrudes, is formed by a second collar 38 of the second fitting part 12.

The slide bearing bush 28 is consequently received in a rotationally rigid manner in this second collar 38. Just like the first collar 19, the second collar 38 can be formed on the second fitting part 12 (i.e. formed in one piece) or be fixed to it as a separate sleeve.

The driver 21 is secured axially to the outside of the first fitting part 11 by a clipped-on securing ring 43. Provided on the outside of the second fitting part 12, between the radially outer edge thereof and the covering disk 25, is a sealing ring 44 which is composed, for example, of rubber or soft plastics material and which is connected, in particular clipped, to the covering disk 25.

The wedge segments 27 (and the Omega spring 35) define an eccentric which, in extension of the direction of eccentricity, presses the toothed wheel 16 into the toothed ring 17 at an engagement site so defined. When drive is effected by means of the rotating drive shaft 7, a torque is first of all transmitted onto the driver 21 and then, by means of the driver segment 29, onto the eccentric which slides along the slide bearing bush 28, shifting the direction of eccentricity and thus shifting the site of engagement of the toothed wheel 16 in the toothed ring 17, this presenting itself as a wobbling rolling movement, i.e. as a relative rotation with a superimposed wobbling movement. As a result, the inclination of the backrest 4 is continuously adjustable between several use positions.

Depending on the mounting of the fitting 10, the eccentric (i.e. the wedge segments 27) is supported by the second fitting part 12, while it, for its part, supports the first fitting part 11, or the relationships are exactly reversed, i.e. the eccentric rests on the first fitting part 11 and supports the second fitting part 12.

Under dynamic operating conditions, shaking or pushing of the backrest 4 (shock-type torque on the drive output side) can cause the fitting 10 to "spool", i.e. the fitting 10, for minimum periods of time, is no longer free of backlash, so that it turns in tiny steps. To avoid this, a locking element 50 is provided. The basic principle of the locking element 50 is described in DE 195 48 809 C1, the relevant disclosure of which is expressly incorporated herein (corresponding U.S. Pat. No. 5,871,414 is herby incorporated by reference in its entirety) . The locking element 50 is formed in one piece of spring steel and—axially on the side facing the covering disk 25—radially encircles the outside of the slide bearing bush 28, i.e. surrounds it in the form of a ring. Like in the DE 195 48 809 C1, the locking element 50 is provided with two axially protruding angled supporting fingers 52 for cooperating with the driver 21, precisely speaking with two stops 25a at the covering disk 25. The end fingers of the Omega spring 35 engage through sufficiently big openings 54 of the locking element 50, in order to reach the wedge segments 27.

The slide bearing bush 28 axially protrudes over the second collar 38 of the second fitting part 12. In the axially protruding part, the slide bearing bush 28 has a radially outward facing toothing 28a. The locking element 50 is supported at this toothing 28a by means of preferably three bearing segments 56. The bearing segments 56 axially protrude from the locking element 50, on the side facing the second fitting part 12. The axial dimension of the bearing segments 56 corresponds to the axial dimension of the toothing 28a, i.e. of the protruding part of the slide bearing bush 28. At each of the two supporting fingers 52, one of the three bearing segments 56 can be provided, while the third bearing segment 56, which can be formed differently from the two others, can be provided, for example, at the openings 54. A pre-tension in the locking element 50, for example, due to a slightly elliptic shape, provides for a good seat of the locking element 50 on the slide bearing bush 28 in the area of the bearing segments 56. Between the bearing segments 56, the locking element 50 is in some places spaced apart from the slide bearing bush 28.

The ring-shaped locking element 50 additionally is provided with two toothed segments 58, which face radially inward. The toothed segments 58 are arranged, for example, close to the supporting fingers 52 and, in the peripheral direction, adjacent to the bearing segments 56. When the fitting 10 is not driven, it locks due to the maximum backlash-free eccentricity of the wedge segments 27 upon which the Omega spring 35 acts and due to the friction between the wedge segments 27 and the collar 19. Then, also the toothed segments 58 of the locking element 50 mesh with the toothing 28a of the slide bearing bush 28. If, under the named dynamic operating conditions, eccentricity were to be reduced temporarily, so that the wedge segments 27 abruptly move slightly, this will have no influence on the meshing between the toothed segments 58 and the toothing 58a. The locking element 50, by the contact of the end fingers of the Omega spring 35 with the edge of the opening 54, rather prevents the Omega spring 35—and consequently the wedge segments 27—from rotating further.

When the fitting 10 is driven, the leading stop 25a of the driver 21 presses against the assigned supporting finger 52 of the locking element 50. The locking element 50 deforms, so that the toothed segments 58 get detached from the toothing 28a of the slide bearing bush 28, before the driver segment 29 acts upon the wedge segment 27 on the side opposed to the leading stop 25a. With every further rotation of the driver 21, the locking element (and consequently also the openings 52) is taken along in an unlocked state. The wedge segments 27 can thus move unhindered. When the rotation of the driver 21 ends, the pre-tension of the locking element 50 again provides for its locked state.

Figure 6:
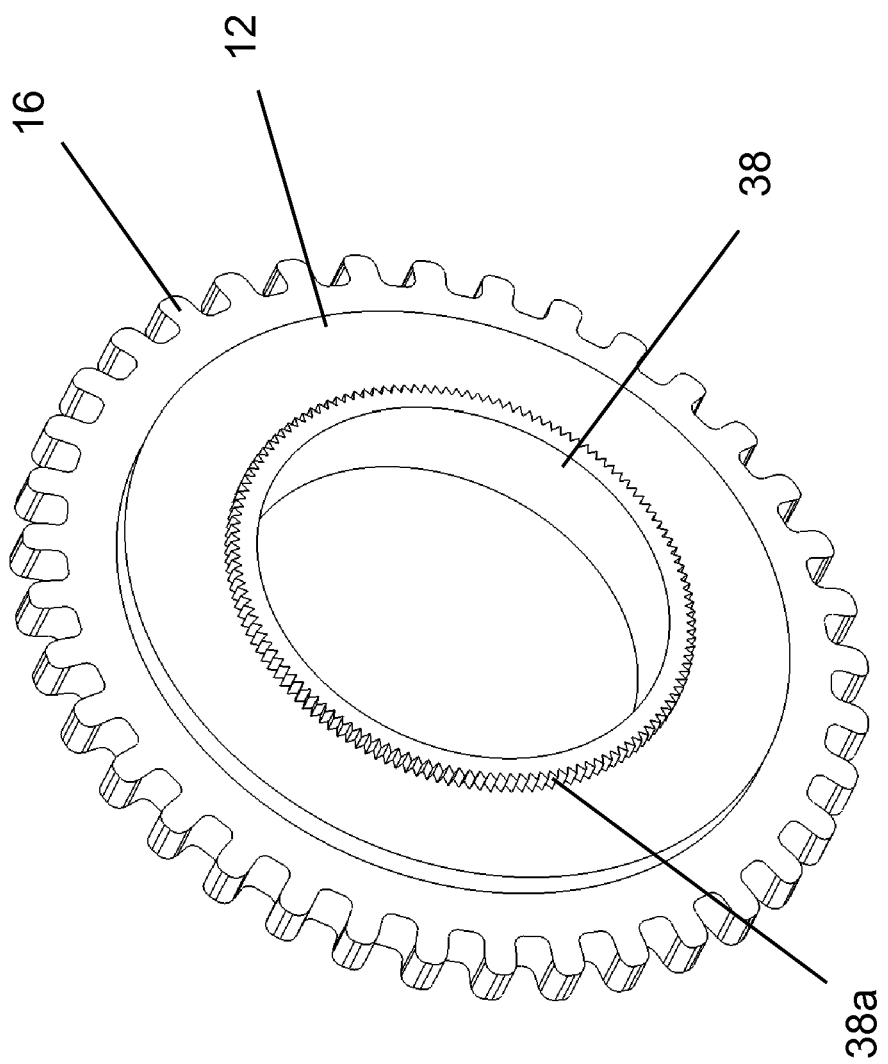
FIG. 6 is a perspective partial view of a modification.

A modification of the exemplary embodiment corresponds to the exemplary embodiment, unless otherwise described, so that identical and identically acting components have the same reference numerals. In this modification, a radially outward facing toothing 60a is formed on the second collar 38, such toothing cooperating with the locking element 50 (which surrounds the second collar 38 like a ring). The slide bearing bush 28 correspondingly is flush with the second collar 38, i.e. without axial projection and without toothing 28a. The second fitting part 12 of this modification is shown in FIG. 6. The second fitting part 12 ends at the toothed wheel 16, so that the enclosing ring 13 is reasonably arranged on the other front side of the first fitting part 11, in order to be able to engage into the second fitting part 12 and to be fixed at the first fitting part 11 (with a slightly smaller diameter). If the inner side of the second collar 38 or the outer side of the wedge segments 27 are suitably coated, the slide bearing bush 28 can be completely omitted.

While specific embodiments of the invention have been described in detail to illustrate the application of the principles of the invention, it will be understood that the invention may be embodied otherwise without departing from such principles.

The invention claimed is:

1. A fitting, the fitting comprising:
   a first fitting part on which a toothed ring is formed;
   a second fitting part on which a toothed wheel is formed which meshes with the toothed ring, as a result of which the two fitting parts are in gear connection with each other;
   a driver;
   a collar;
   a circumferential eccentric, driven by the driver, for driving a relative rolling movement of the toothed wheel and the toothed ring, the eccentric being rotatably mounted in the collar which is assigned to one of the two fitting parts, or in a bearing bush which is supported in a rotationally secure manner in the collar; and
   a locking element for the eccentric, such locking element being at least temporarily effective between the eccentric and the fitting part which is provided with the collar, the bearing bush or the collar having a radially outward facing toothing, and the locking element, which surrounds the bearing bush and/or the collar in a ring-shaped manner, has at least one radially inward facing toothed segment for cooperating with the toothing.

2. A fitting according to claim 1, wherein in a locked state of the locking element, if the driver is not driven, the at least one toothed segment meshes with the toothing.

3. A fitting according to claim 2, wherein in an unlocked state of the locking element, the at least one toothed segment and the
   toothing, drop out of mesh by means of the driven driver.

4. A fitting according to claim 3, wherein the locking element has at least one supporting finger, which cooperates with one stop of the driver.

5. A fitting according to claim 2, wherein the locking element, in the locked state, has a pre-tension.

6. A fitting according to claim 5, wherein a deformation of the ring-shaped locking element generates the pre-tension.

7. A fitting according to claim 1, wherein the locking element is formed in one piece of spring steel.

8. A fitting according to claim 1, wherein the locking element has at least two bearing elements, which, in a circumferential direction, displaced with respect to the at least one toothed segment, bear against the bearing bush or the collar, respective toothing.

9. A fitting according to claim 1, wherein two wedge segments and an Omega spring define the eccentric.

10. A fitting according to claim 9, wherein the locking element has openings, through which the Omega spring engages.

11. A vehicle according to claim 9, wherein the locking element has two openings, through which the Omega spring engages.

12. A vehicle seat comprising:
a seat part;
a backrest; and
a fitting, an inclination of the backrest being adjusted by means of the fitting, the fitting comprising:
a first fitting part on which a toothed ring is formed;
a second fitting part on which a toothed wheel is formed which meshes with the toothed ring, as a result of which the two fitting parts are in gear connection with each other;
a driver;
a collar;
a circumferential eccentric driven by the driver, for driving a relative rolling movement of the toothed wheel and the toothed ring, the eccentric being rotatably mounted in the collar which is assigned to one of the two fitting parts, or in a bearing bush which is supported in a rotationally secure manner in the collar; and
a locking element for the eccentric, the locking element being at least temporarily effective between the eccentric and the fitting part which is provided with the collar, the bearing bush or the collar having a radially outward facing toothing, and the locking element which surrounds the bearing bush and/or the collar in a ring-shaped manner has at least one radially inward facing toothed segment for cooperating with the toothing.

13. A vehicle according to claim 12, wherein in a locked state of the locking element, if the driver is not driven, the at least one toothed segment meshes with the toothing.

14. A vehicle according to claim 13, wherein in an unlocked state of the locking element, the at least one toothed segment and the toothing, drop out of mesh by means of the driver driving the relative rolling movement.

15. A vehicle according to claim 14, wherein the locking element has supporting fingers each of which cooperates with one stop of the driver.

16. A vehicle according to claim 13, wherein the locking element, in the locked state, has a pre-tension.

17. A vehicle according to claim 16, wherein a deformation of the ring-shaped locking element generates the pre-tension.

18. A vehicle according to claim 12, wherein the locking element is formed in one piece of spring steel.

19. A vehicle according to claim 12, wherein the locking element has at least two bearing elements, in a circumferential direction, displaced with respect to the at least one toothed segment, bear against the respective
toothing of the bearing bush or the collar.

20. A vehicle according to claim 12, wherein two wedge segments and an Omega spring define the eccentric.

* * * * *